US007020944B2

(12) United States Patent
Klann

(10) Patent No.: US 7,020,944 B2
(45) Date of Patent: Apr. 4, 2006

(54) PRESSING-OUT DEVICE FOR ECCENTRIC SUPPORT JOINTS

(75) Inventor: Horst Klann, Villingen-Schwenningen (DE)

(73) Assignee: Klann Spezial Werkzeugbau GmbH, Donaueschingen (DE)

( * ) Notice: Subject to any disclaimer, the term of this patent is extended or adjusted under 35 U.S.C. 154(b) by 72 days.

(21) Appl. No.: 10/745,433

(22) Filed: Dec. 23, 2003

(65) Prior Publication Data

US 2004/0134053 A1 Jul. 15, 2004

(30) Foreign Application Priority Data

Dec. 24, 2002 (DE) .......................... 202 19 954 U

(51) Int. Cl.
*B23P 19/04* (2006.01)

(52) U.S. Cl. ........................................................ 29/263

(58) Field of Classification Search .................. 29/263, 29/266, 252

See application file for complete search history.

(56) References Cited

U.S. PATENT DOCUMENTS 3,123,901 A * 3/1964 Traugott ...................... 29/263
3,887,989 A * 6/1975 Maynard ..................... 29/263

FOREIGN PATENT DOCUMENTS

| | | |
|---|---|---|
| DE | 74 34 153 | 1/1975 |
| DE | 75 150 90 | 8/1975 |
| DE | 37 30 017 C1 | 1/1989 |
| DE | 298 05 584 | 7/1998 |
| DE | 42 11 765 C2 | 1/1999 |
| DE | 201 06 519 U1 | 8/2001 |
| DE | 202 06 000 U1 | 9/2002 |

* cited by examiner

*Primary Examiner*—Robert C. Watson
(74) *Attorney, Agent, or Firm*—McGlew & Tuttle, P.C.

(57) ABSTRACT

A device (1) is provided for pressing out a component pressed into a bearing bore of a bearing eye of an axle component. The device includes a support bell (2) being supported at the bearing eye in the area around the bearing bore and a pressure piece (20), which can be pushed axially through the bearing bore together with the component. The pressing device can be operatively positioned or mounted to the support bell (2) and to the pressure piece (20) for the pressing-out operation. To make it possible to carry out the pressing-out operation simply and reliably, provisions are made for arranging a clamping plate (12), which can be detachably connected to the support bell (2) and via which the support bell (2) is held at the bearing eye (24) in a firmly seated manner, at the bearing eye (12) axially opposite the support bell (2).

7 Claims, 3 Drawing Sheets

Fig. 2 - Prior Art
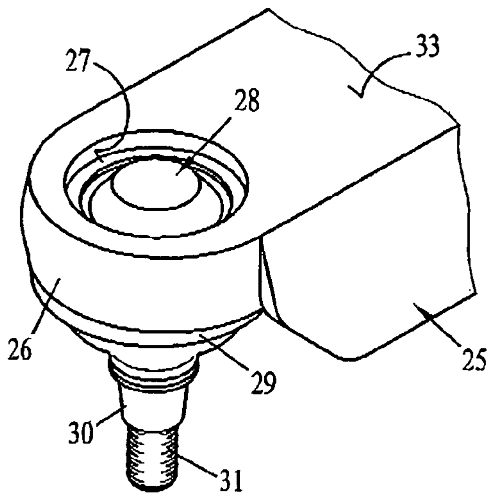
Fig. 3 - Prior Art
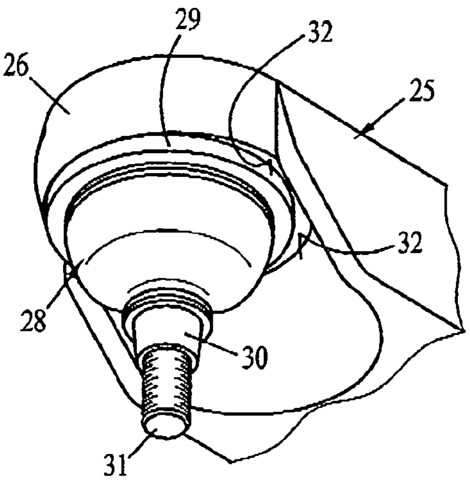
Fig. 4
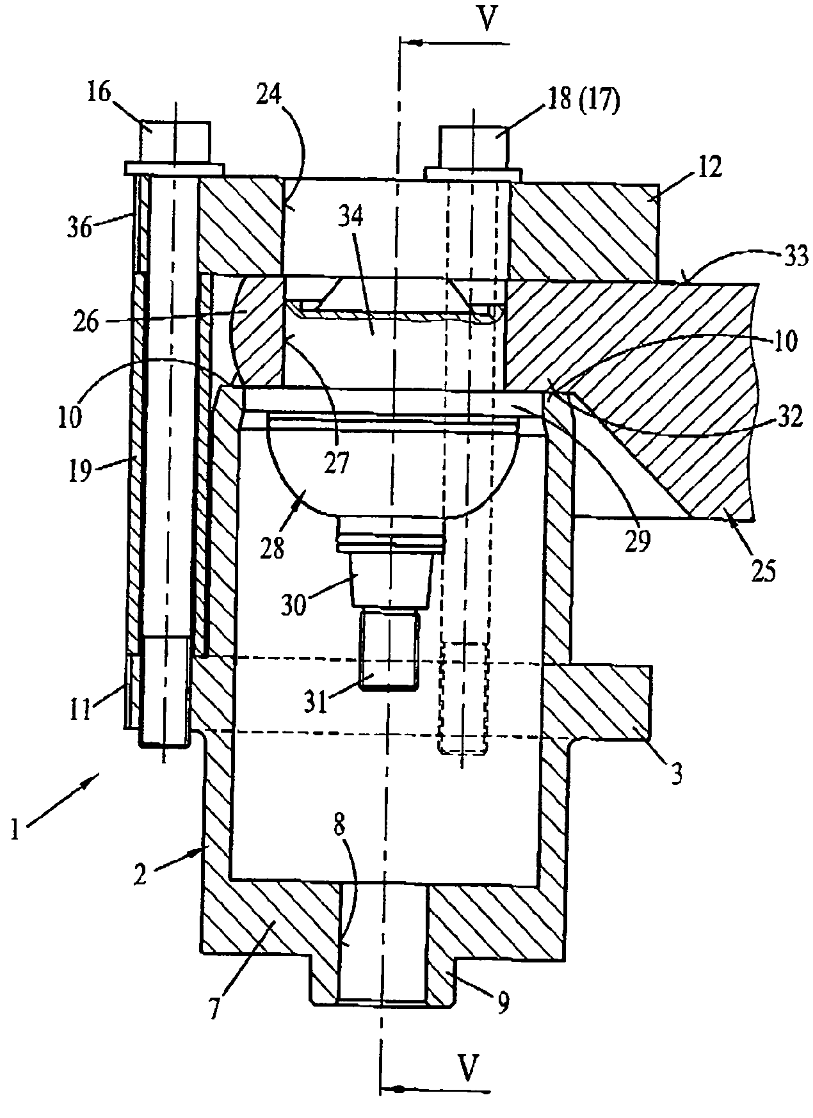

PRESSING-OUT DEVICE FOR ECCENTRIC SUPPORT JOINTS

FIELD OF THE INVENTION

The present invention pertains to a device for pressing out a component pressed into a bearing bore of a bearing eye of an axle component, comprising a support bell supported at the bearing eye in the area around the bearing bore and a pressure piece, which can be pushed together with the component axially through the bearing bore, wherein a pressing device can be mounted or operatively positioned relative to the support bell and the pressure piece for the pressing-out operation.

BACKGROUND OF THE INVENTION

Devices of the type are known from, e.g., DE 37 30 017 C1, DE 42 11 765 C2 or also DE 201 06 519.3 U1. The devices described in these documents are used essentially to press out wheel bearings pressed into a bearing bore of a motor vehicle axle or so-called silent bearings of an axle carrier of a motor vehicle. The feature common to them is that, on the one hand, a support bell or support frame is provided, which is supported in the circumferential area of the bearing bore during the pressing-out operation. A pressure piece, whose dimensions are adapted to the component to be pressed out and to the bearing bore such that is can be operatively positioned to the component or into the bearing bore at the beginning of the pressing-out operation in a centered manner, is used on the side of the bearing bore located axially opposite this support bell. The pressure piece and the support bell as well as the spindle drives extending through the component to be pressed out can be considered for use as pressing devices, as they are described in the documents mentioned.

On the other hand, stationary, so-called upright stand presses, which are disclosed especially in DE 201 06 519.3 U1, are also used as pressing devices. If it is necessary to work directly at the vehicle, a so-called pressing frame is used as the pressing device, which is provided with a hydraulic cylinder and a pressing screw, by means of which the pressure piece is pressed into the axially opposite support bell together with the component to be pressed out through the bearing bore. Such a pressing frame has a design essentially identical to that of a stand press, but its dimensions are smaller, so that it can be handled manually at the vehicle.

It was found that especially when they are used directly at the vehicle, the prior-art devices cannot be operatively positioned satisfactorily to the bearing bore or the bearing eye surrounding the bearing bore. Furthermore, axle constructions have also become known in which the component to be pressed out is provided with a circumferentially extending stop web, by which the depth to which these components are pressed in during the pressing in of these components into the bearing bore is defined. It may also happen in the case of such components with such a stop web that the support surface available for supporting the support bell at the bearing eye is not completely circumferentially extending, so that the support bell cannot be supported at the bearing eye over the full circumferential area. The consequence of this is, in turn, that the support bell is tilted during the operative positioning or mounting and especially during the subsequent clamping operation and the support bell and/or the support surface of the bearing eye is thus damaged. In addition, a defined pressing out of such a component is possible now only conditionally, because the supporting is no longer concentric with the component to be pressed out, and damage to the pressing may device may thus occur as well. The pressing-out forces also do not act concentrically with the central longitudinal axis of the bearing eye any longer in case of tilting of the support bell, so that considerably stronger forces are necessary.

SUMMARY OF THE INVENTION

Consequently, the basic object of the present invention is to improve a device of the type such that the above-described drawbacks of the prior-art device are eliminated or at least mitigated.

The object is accomplished according to the present invention by providing a clamping plate at the bearing eye, which clamping plate is located axially opposite the support bell and can be detachably connected to the support bell and via which the support bell is held snugly or tightly at the bearing eye.

Due to the design according to the present invention, the support bell or support frame is fixed in a defined position at the bearing eye before the pressing device is mounted or operatively positioned. This is especially advantageous when the device is used directly at a vehicle, at the axle of the motor vehicle, because the pressing device can be mounted or operatively positioned relative to the support bell in a defined position, aligned coaxially with the bearing bore. Furthermore, the support bell is also fixed at the bearing eye such that tilting is ruled out with certainty, especially in the case in which the support surface on which the support bell is supported is not fully circular and the support bell can be supported in partial area of the circumferential area around the bearing bore only.

According to another aspect of the invention, provisions may be for the support bell to be provided for coupling with the clamping plate with a circular or outwardly extending circumferentially or radially outwardly projecting holding web, into which at least two tightening screws can be screwed for stationary connection with the clamping plate. The mounting of the support bell or support frame together with the clamping plate at the bearing eye is extremely simple due to this design. In addition, inexpensive manufacture is ensured. Due to the use of tightening screws, the device can, furthermore, be adapted to the dimensions of the bearing eye, especially to the axial length thereof, in a simple manner.

Provisions may be made according to the present invention for three tightening screws to be provided, of which the first one can be arranged diametrically opposite the axle component in relation to the bearing eye in front of the axle component and the other two can be arranged offset rearward toward the axle component outside the middle of the bearing eye. It is ensured due to this design that both the clamping plate and the support bell can be aligned essentially coaxially with the bearing bore. Especially due to the arrangement of the tightening screws, the support bell can be pressed against the bearing eye with a circumferentially uniform pressing pressure around the bearing bore.

According to another aspect of the invention, provisions may be made for providing a spacer tube in the area of the first tightening screw between the holding web of the support bell and the clamping plate, by which said spacer tube the distance between the support bell and the clamping plate is defined such that the bearing eye is accommodated fittingly but slightly clampingly between the support bell and the clamping plate. This design is especially advantageous if there is no support surface or if there is only an insufficient support surface for supporting the support bell in the area of the first tightening screw, i.e., on the outside at the axle component, e.g., because of the eccentric arrangement of the component to be pressed out. A predetermined, minimal distance is defined by the spacer tube between the support bell and the clamping plate. As a result, the support bell is prevented from tilting or being angled during the pressing-out operation, on the one hand, and, on the other hand, damage, especially damage to the support surface of the bearing eye, which support surface is provided for the support bell, is prevented from occurring.

Furthermore, provisions may be made for providing an optical marking in the clamping plate and in the holding web of the support bell in the area of the first tightening screw. Due to this design, a locating aid is made available to the mechanic, by means of which he can recognize the correct angular position to be selected for both the support bell and the clamping plate during mounting or operative positioning at the bearing eye. This is especially significant when the second and third tightening screws have a greater distance from each other in the circumferential direction, taking into consideration the width of the axle component, than the distances between these respective tightening screws and the first tightening screw, because of the axle construction or the design of the axle.

Provisions are made for the clamping plate to be provided approximately centrally (in the center or middle) with a central hole, whose diameter corresponds at least to the diameter of the bearing bore. It is ensured by this design that the pressure piece, which usually has a diameter that is somewhat smaller than the internal diameter of the bearing hole, can also be positioned reliably at the component to be pressed out through the clamping plate. A certain alignment of the pressure piece is also achieved now at the same time already at the time of positioning at the component to be pressed out.

Provisions may be made for the pressure piece to be able to be inserted into the central hole of the clamping plate axially displaceably with a slight clearance, and for the pressure piece to be able to be engaged with the component to be pressed out in a centered matter, on the one hand, to be able to be coupled with the pressing device for pressing out, on the other hand. The positioning or mounting of the pressure piece at the component to be pressed out is also considerably simplified by this measure.

Due to the design according to another aspect of the present invention the device according to the present invention can be used directly at a motor vehicle in a simple manner. Provisions are made for this for the pressing device to be formed from by a pressing frame with hydraulic cylinder, which pressing frame clasps or encompasses the pressure piece and the support bell for pressing out.

The device according to the present invention is especially suitable for pressing out a support joint from a bearing bore of the bearing eye of a suspension arm of a motor vehicle axle in a reliable and simple manner. Also known are axle constructions in which the support joint is provided with a radially outwardly projecting, circular or circumferentially and outwardly extending stop web, which is used for the accurate axial positioning of the support joint in the bearing bore during the pressing out, i.e., this stop web covers part of the support surface around the bearing bore in the pressed-in state of the support joint, so that the support bell can be supported at the support surface of the bearing eye only radially outside the said stop web during the pressing-out operation if the support bell has a corresponding diameter. If, in addition, the bearing bore and consequently also the support joint are arranged in the bearing eye eccentrically offset in relation to the bearing eye, no support surface, on which the support bell could be axially supported, is available any longer in the outer area of the bearing eye. The device according to the present invention is also very well suited for this application, because tilting is ruled out due to the fixation of the support bell at the bearing eye, especially by means of the three tightening screws, and optimal flow of forces is thus ensured during the pressing-out operation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

FIG. 2 is a perspective top view of the outer end of an axle body designed as a suspension arm with a pressed-in support joint;

FIG. 3 is a perspective bottom view of the suspension arm from FIG. 2;

FIG. 4 is a vertical longitudinal section of the device from FIG. 1 in a state in which it is mounted or operatively positioned at the bearing eye of the suspension arm from FIGS. 2 and 3.

DESCRIPTION OF THE PREFERRED EMBODIMENT

Figure 1:
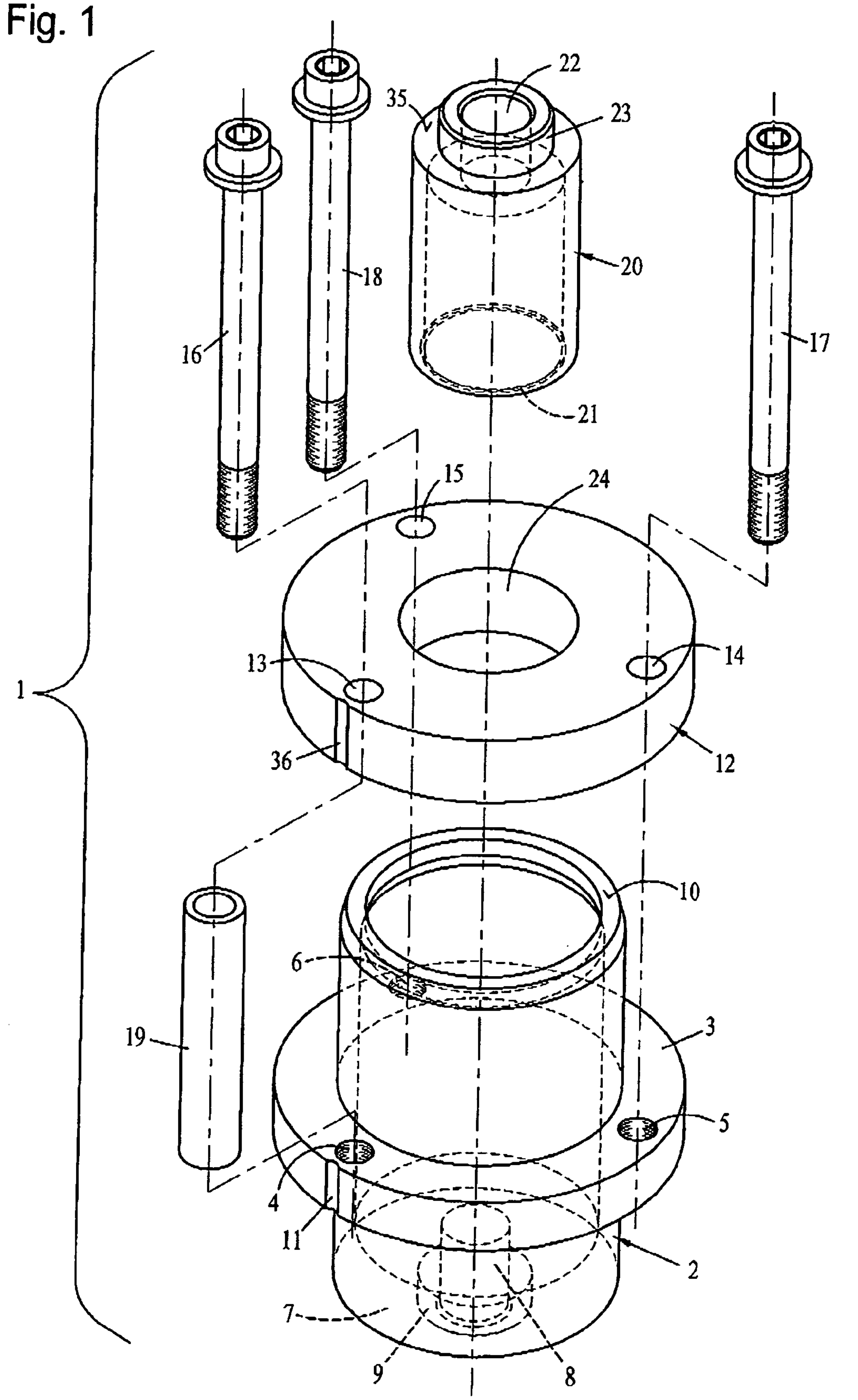
FIG. 1 is a perspective exploded view of an exemplary embodiment of a device according to the present invention.

Referring to the drawings in particular, FIG. 1 shows a perspective exploded view of the components of a device 1 according to the present invention.

The device 1 according to the present invention comprises a support frame or support bell 2, which has a radially outwardly projecting holding web 3 on its outer circumference. This holding web 3 is provided with three internal threads 4, 5 and 6.

The support bell 2 has, furthermore, a front wall 7 with a central through hole 8 at its lower end. An axially downwardly projecting support cylinder 9, by means of which the support bell 2 can be coupled with a pressing device, is provided in the area of the said through hole 8. On its front side located opposite this support cylinder 9, the support bell 2 forms a front ring surface 10, via which the support bell 2 is supported at a corresponding support surface surrounding the bearing bore during the pressing of a component out of the said bearing bore, as will be described below.

As is also apparent from FIG. 1, an optimal marking in the form of a partially cylindrical notch 11 is provided on the outer circumference of the holding web 3 in the area of the first internal thread 4.

An annular clamping plate 12, which is provided with three through holes 13, 14 and 15, is associated with the support bell 2 in this exemplary embodiment. The arrangement of these through holes 13, 14 and 15 on the circumference of the clamping plate 12 corresponds to the arrangement of the three internal threads 4, 5 and 6 of the holding web 3 of the support bell 2. Furthermore, the clamping plate 12 is provided centrally with a central hole 24.

Three tightening screws 16, 17 and 18, which can be passed correspondingly through the corresponding through holes 13, 14 and 15 for mounting and can be screwed into the corresponding internal threads 4, 5 and 6 of the holding web 3, are provided for the stationary fixing or fastening of the clamping plate 12 to the support bell 2. A spacer tube 19, which is arranged between the holding web 3 and the clamping plate 12 before the mounting of the tightening screw 16, is provided in the area of the through hole 13 and the internal thread 4. The axial length of this spacer tube 19 corresponds to the axial height of a bearing eye, at which the device 1 is provided for pressing out a component pressed into the bearing bore of the bearing eye.

Furthermore, as is apparent from FIG. 1, a cylindrical pressure piece 20 is provided for pressing out such a component, the said pressure piece having a radially inwardly offset, axial projecting, annular centering web 21 (indicated by broken line) in this exemplary embodiment. At its end located opposite this centering web 21, the pressure piece 20 has a through hole 22, which in turn has an axially projecting centering cylinder 23 arranged concentrically with the through hole 22.

This device shown in FIG. 1 is used to press a component out of a bearing bore. Such a component is shown as an example in FIGS. 2 and 3. Thus, the outer end of an axle component in the form of a suspension arm 25 of a motor vehicle axle can be recognized in FIGS. 2 and 3. In its outer end area, this axle component 25 has a bearing eye 26, in which the bearing bore 27 is arranged. A component to be pressed out, which is a support joint 28 in this case, is pressed into this bearing bore 27. This presses this support joint 28 accurately precisely into the bearing bore 28, the support joint 28 has a radially outwardly projecting, annular stop web 29, with which is support joint 28 is seated on the underside on a support surface 32 of the suspension arm 25 in the edge area of the bearing bore 27 in the pressed-in state shown in FIGS. 2 and 3. Furthermore, the support joint 28 is provided with a support joint pin 30, which has a threaded section 31 at its outer end. The support joint 28 and consequently the suspension arm 25 are connected via this support joint pin 30 and the threaded section 31 with another axle component of a motor vehicle axle in an articulated manner.

It can be recognized from FIG. 3 in this special embodiment of the mounting of the support joint 28 in the bearing bore 27 that the support joint 28 with its stop web 29 is not arranged concentrically with the support surface 32. Due to this eccentric arrangement of this support joint 28 in the bearing eye 26, the support surface 32 is not present in the outer end area of the bearing eye 26. This in turn means that a support bell used for the pressing out, as it is shown in FIG. 1, cannot be supported fully over the circumference on the support surface 32 of the suspension arm 25 to press the support joint 28 out of the bearing eye 26. However, such a support joint can also be pressed out without problems with the device according to the present invention, which is shown as an example.

The mode of operation of the device 1 according to the present invention can be seen in the vertical longitudinal section in FIG. 4.

It can be recognized that the support bell 2 with its front ring surface 10 is pushed over the stop web 29 of the support joint 28 and is supported in the inner area on the support surface 32 of the bearing eye 26. Furthermore, it can be recognized that the support joint 28 with its support joint pin 30 and its threaded section 31 protrudes or extends into the support bell 2 and has a certain axial distance from the lower front wall 7 of the support bell 2 in this state of the support bell 2, in which the support bell is mounted to the bearing eye 26. The support joint 28 has, furthermore, a cylindrical section 34, via which the support joint 28 is pressed tightly or snugly into the bearing bore 27 of the bearing eye 26.

As is also apparent from FIG. 4, the clamping plate 12 is arranged on the top side on the upper, flat support surface 33 of the suspension arm 25. The clamping plate 12 is screwed to the holding web 3 of the support bell 2 by means of the screws 16, 17 and 18, so that the device 1 is tightly or snugly fastened to the bearing eye 26.

The spacer tube 19 is arranged between the holding web 3 and the clamping plate 12 in the area of the tightening screw 16 and the two optical markings 11 and 36. It can be recognized that the length of this spacer tube 19 is selected to be such that the axial distance between the clamping plate 12 and the upper front ring surface 10 of the support bell 2 corresponds approximately exactly to the axial height of the bearing eye 26. The support bell 2, which has no abutment for its front ring surface 10 in FIG. 4 in the left-hand, outer area of the bearing eye 26, is thus prevented by this spacer tube 19 with certainty from tiling with certainty, but will remain in the position aligned coaxially with the bearing bore 27 during its pressing out.

Figure 5:
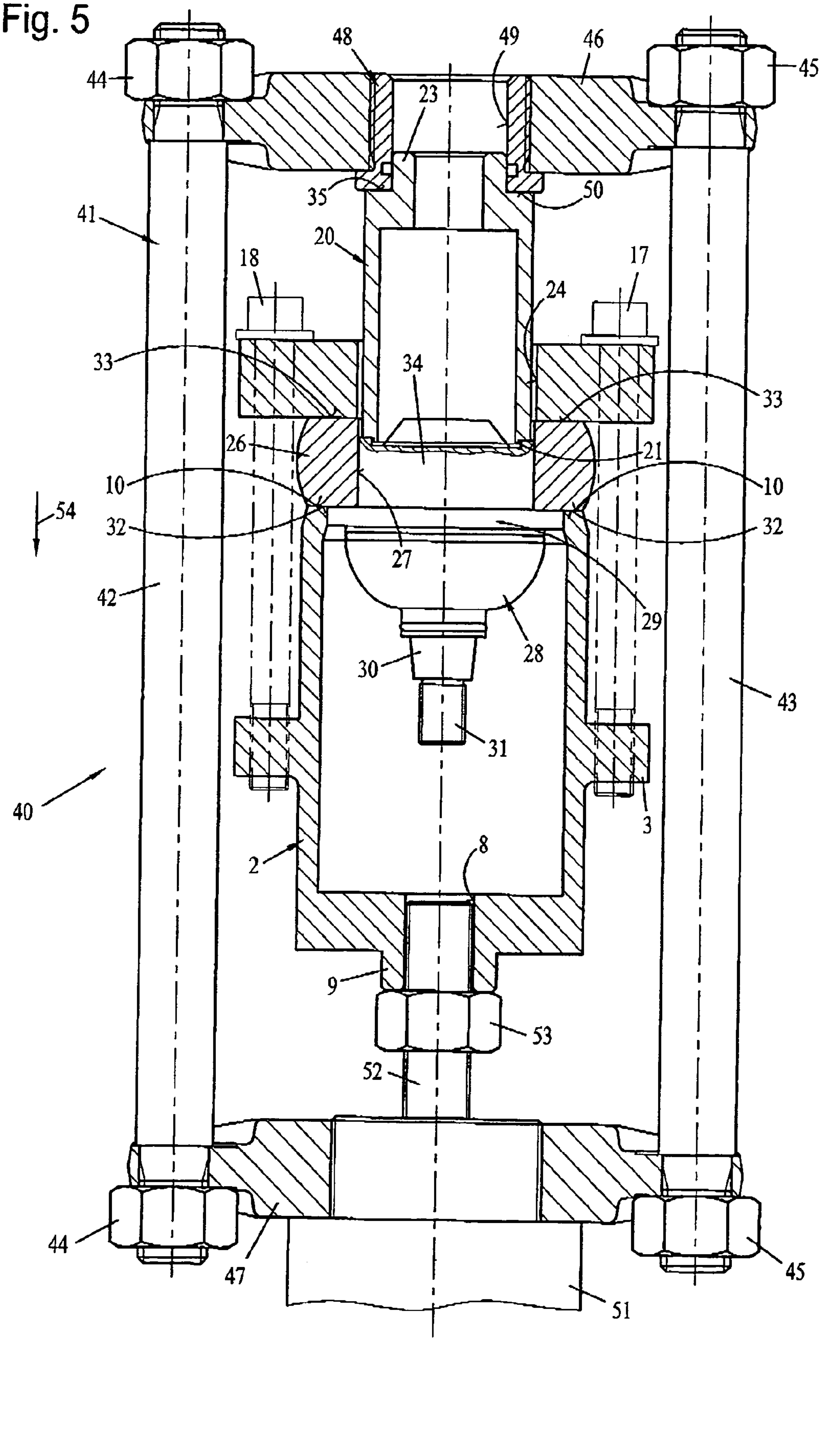
FIG. 5 is a section V—V from FIG. 4 with a pressing frame and a complete device according to the present invention immediately before the pressing-out operation.

After the support bell 2 has now been mounted stationarily (i.e., in a fixed manner) at the bearing eye 26 together with the clamping plate 12, the tightening screws 16, 17 and 18 as well as the spacer tube 19 in the manner shown in FIG. 4, the pressure piece 20 is introduced into the central hole 24 of the clamping plate 12, as is apparent from FIG. 5.

FIG. 5 shows a vertical section V—V from FIG. 4. The two clamping screws 17 and 18 arranged laterally next to the suspension arm 25 are indicated by phantom lines, because they are actually not visible in the view for which FIG. 5 is taken because of the course of the section line. However, it can be recognized that these two tightening screws 17 and 18 are arranged laterally next to the suspension arm or the bearing eye 26. Because of the width of this suspension arm, these two tightening screws 17 and 18 can be arranged symmetrically to the suspension arm 25. However, the through holes 13, 14 and 15 as well as the internal threads 4, 5 and 6 of the holding web 3 are not arranged in a uniformly distributed pattern over the circumference because of the dimensions. It is important in this connection to arrange both the support bell 2 and the clamping plate 12 in a correct angular position at the bearing eye 26. The optical marking 11 of the holding 3 as well as the optical marking 36 of the clamping plate 12 are provided for this purpose. Due to these optical markings 11 and 36 being arranged on the outer side of the bearing eye 26 located opposite the suspension arm, the installer (i.e., the mechanic) can thus always recognize and also set in a simple manner the correct angular position of the clamping plate 12 and of the support bell 2 in a simple manner.

As is apparent from FIG. 5, a pressing device 40, which comprises a pressing frame 41, which has in turn two tie rods 42 and 43 in this exemplary embodiments, the said tie rods 42 and 43 extending in parallel to the bearing bore 27 of the bearing eye 26, as is shown in FIG. 5. Respective clamping nuts 44 and 45, by which an upper baseplate 46 as well as a lower baseplate 47 are stationarily fastened to the tie rods 42 and 43, are screwed onto the tie rods 42 and 43 in their two end areas.

An adapter 48 is screwed into the upper baseplate 46 in this exemplary embodiment, and the pressure piece 20 with its upper centering cylinder 23 is pushed into the central centering hole 49 of the said adapter with a slight clearance. The pressure piece 20 with its pressing surface 35 surrounding the centering cylinder 23 is supported axially on the underside on the lower front ring surface 50 of the adapter 48.

Furthermore, it can be recognized from FIG. 5 that the pressure piece 20 with its lower, axially projecting centering web 21 is accommodated in the correspondingly designed shaped front surface of the cylinder section 34 of the support joint 28 in a centered manner. Furthermore, it can be recognized from FIG. 5 that the pressure piece 23 can be passed through the central hole 24 of the clamping plate 12 with a clearance and can be pushed through in the direction of arrow 54 during the pressing-out operation.

The support bell 2 is supported on the underside with its upper front ring surface 10 in the lateral area recognizable from FIG. 5 flatly axially on the lower support surface 32 of the bearing eye 26 next to the stop web 29.

A pressing screw 52 of a hydraulic cylinder 51, which said cylinder is screwed from the outside into the lower baseplate 47 of the pressing frame 41, protrudes into the lower through hole 8. An adjusting nut 53, at which the support bell 2 with its axially outwardly projecting support cylinder 9 is supported, is provided on the pressing spindle 52 for axial support during the pressing-out operation.

It can be easily imagined that when the hydraulic cylinder 51 is activated, the pressing frame 41 will be pulled downward in the direction of arrow 54, so that the support joint 28 with its cylindrical section 34 will be reliably pressed out of the bearing bore 27 of the bearing eye 26 by the pressure piece 20 moving along with it and will be accommodated in the support bell 2. The axial length of the support bell 2 is selected to be such that the support joint 28 with its support joint pin 30 and its threaded section 31 will be completely accommodated in the support bell 2.

It can be recognized that because of the clamping plate 12 associated with the support bell 2 as well as the special manner of mounting the support bell 2 via the clamping plate 12 together with the tightening screws 16, 17 and 18 and especially the spacer tube 19, the support bell 2 is reliably prevented from tiling during the pressing-out operation. It is achieved as a result that the front ring surface 10 of the support bell 2, on the one hand, and the incompletely circular lower support surface 32 of the bearing eye 26, on the other hand, cannot be damaged. The spacer tube 19 as well as the tightening screws 17 and 18 arranged offset in the "rearward" direction toward the axle component or the suspension arm 25 also contribute to this, in particular. In particular, the "front," first tightening screw 16 is reliably prevented by the spacer tube 19 from being tightened excessively when it is being tightened, so that, which would as a result cause the support bell 2 to be tilted without the spacer tube 19.

While a specific embodiment of the invention has been shown and described in detail to illustrate the application of the principles of the invention, it will be understood that the invention may be embodied otherwise without departing from such principles.

What is claimed is:

1. A device for pressing out a component pressed into a bearing bore of a bearing eye of an axle component, the device comprising:

a support bell supported at the bearing eye in an area around the bearing bore;

a pressure piece, which can be pushed axially through the bearing bore together with the component;

a pressing device mounted to said support bell and to said pressure piece for the pressing-out operation;

a clamping plate detachably connected to said support bell to fix the bearing eye between said support bell and said clamping plate in a clamping manner so that said support bell is held tightly at the bearing eye, said clamping plate being provided at the bearing eye axially opposite said support bell, wherein for coupling with said clamping plate, said support bell is provided with an annular radially outwardly projecting holding web, and two tightening screws screwed into said holding web for the stationary connection with the clamping plate.

2. A device in accordance with claim 1, further comprising a third tightening screw wherein said tightening screws are provided with a first arranged diametrically opposite the axle component in relation to the bearing eye in front of the axle component and the other two tightening screws are arranged laterally adjacent to the bearing eye, outside the center of the bearing eye, offset in a rearward direction toward the axle component.

3. A device in accordance with claim 2, wherein a spacer tube is provided, said spacer tube defining a distance between said support bell and said clamping plate such that the bearing eye is accommodated fittingly, but slightly clampingly between said support bell and said clamping plate, said spacer tube being is provided in an area of said first tightening screw between said holding web of said support bell and said clamping plate.

4. A device in accordance with claim 2, wherein an optical marking is provided on the clamping plate and on the holding web of said support bell in an area of said first tightening screw.

5. A device in accordance with claim 1, wherein said damping plate is provided approximately centrally with a central hole having a diameter corresponding at least to the diameter of the bearing bore.

6. A device in accordance with claim 5, wherein the pressure piece can be inserted into the central hole of the clamping plate with a slight clearance in an axially displaceable manner, and said pressure piece can be brought into engagement with the component to be pressed out in a centered manner, on the one hand, and can be coupled with the pressing device for pressing out.

7. A device for pressing out a component pressed into a bearing bore of a bearing eye of an axle component, the device comprising:

a support bell supported at the bearing eye in an area around the bearing bore;

a pressure piece, which can be pushed axially through the bearing bore together with the component;

a pressing device mounted to said support bell and to said pressure piece for the Pressing-out operation;

a clamping plate detachably connected to said support bell to fix the bearing eye between said support bell and said clamping plate in a clamping manner so that said support bell is held tightly at the bearing eye, said clamping plate being provided at the bearing eye axially opposite said support bell, wherein; said clamping plate is provided approximately centrally with a central hole having a diameter corresponding at least to the diameter of the bearing bore; said pressure piece can be inserted in the central hole of the clamping plate with a slight clearance in an axially displaceable manner whereby said pressure piece can be brought into engagement with the component to be pressed out in a centered manner, on the one hand, and can be coupled with the pressing device for pressing out; and said pressing device comprises a pressing frame with a hydraulic cylinder which clasps said pressure piece and said support bell for a pressing out operation.

* * * * *